United States Patent
Gosalia et al.

(10) Patent No.: US 8,539,443 B2
(45) Date of Patent: Sep. 17, 2013

(54) EDIT TIME ANALYZER IN A LOOSELY TYPED TEXTUAL LANGUAGE

(75) Inventors: Rishi H. Gosalia, Austin, TX (US); Jesse M. Attas, Austin, TX (US); Bryan A. Marker, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1108 days.

(21) Appl. No.: 12/119,578

(22) Filed: May 13, 2008

(65) Prior Publication Data

US 2009/0288073 A1 Nov. 19, 2009

(51) Int. Cl.
*G06F 9/44* (2006.01)

(52) U.S. Cl.
USPC .......................... 717/113; 717/143

(58) Field of Classification Search
USPC .................................. 707/110, 113
See application file for complete search history.

(56) References Cited

U.S. PATENT DOCUMENTS

| | | | |
|---|---|---|---|
| 4,914,568 A | 4/1990 | Kodosky et al. | |
| 4,989,145 A | 1/1991 | Kyushima | |
| 5,210,837 A | 5/1993 | Wiecek | |
| 5,237,691 A | 8/1993 | Robinson et al. | |
| 5,481,741 A | 1/1996 | McKaskle et al. | |
| 5,610,828 A | 3/1997 | Kodosky et al. | |
| 5,737,608 A | 4/1998 | Van De Vanter | |
| 5,742,828 A | 4/1998 | Canady et al. | |
| 5,748,975 A | 5/1998 | Van De Vanter | |
| 5,999,728 A | 12/1999 | Cable | |
| 6,016,467 A | 1/2000 | Newsted et al. | |
| 6,064,409 A | 5/2000 | Thomsen et al. | |
| 6,091,897 A | 7/2000 | Yates et al. | |
| 6,173,438 B1 | 1/2001 | Kodosky et al. | |
| 6,182,246 B1 | 1/2001 | Gregory et al. | |
| 6,219,628 B1 | 4/2001 | Kodosky et al. | |
| 6,282,699 B1 * | 8/2001 | Zhang et al. | 717/109 |
| 6,286,017 B1 | 9/2001 | Egilsson | |
| 6,487,713 B1 | 11/2002 | Cohen et al. | |
| 6,581,206 B2 | 6/2003 | Chen | |
| 6,701,513 B1 | 3/2004 | Bailey | |

(Continued)

OTHER PUBLICATIONS

What You See Is What You Code: A "live" algorithm development and visualization environment for novice leaners by Christopher D. Hundhausen, Jonathan L. Brown (hereafter Hundhausen), ScienceDirect, journal of Visual Languages and Computing 18 (2007), p. 22-47.*

(Continued)

*Primary Examiner* — Lewis A Bullock, Jr.
*Assistant Examiner* — Hua H Hoang
(74) *Attorney, Agent, or Firm* — Meyertons Hood Kivlin Kowert & Goetzel, P.C.; Jeffrey C. Hood; Joel L. Stevens

(57) ABSTRACT

Analyzing code written in a loosely typed language. User input specifying code for a script may be received. The specified code may be analyzed. More specifically, one or more code portions referenced by the specified code may be determined. Properties of symbols of the specified code and the one or more code portions may also be determined. Additionally, the specified code may be analyzed using the determined properties to determine errors in the specified code. Accordingly, one or more errors may be graphically indicated based on said analyzing. Receiving the user input, analyzing the specified code, and graphically indicating the one or more errors may be performed at edit time.

17 Claims, 20 Drawing Sheets

(56) References Cited

U.S. PATENT DOCUMENTS

| | | |
|---|---|---|
| 6,715,139 B1 | 3/2004 | Kodosky et al. |
| 6,857,118 B2 | 2/2005 | Karr et al. |
| 7,024,660 B2 | 4/2006 | Andrade et al. |
| 7,028,222 B2 | 4/2006 | Peterson et al. |
| 7,117,490 B2 | 10/2006 | Harrison, III et al. |
| 7,302,675 B2 | 11/2007 | Rogers et al. |
| 2001/0020291 A1 | 9/2001 | Kudukoli et al. |
| 2005/0155014 A1* | 7/2005 | Andrade et al. ............ 717/105 |
| 2006/0212843 A1* | 9/2006 | Zaky et al. ................. 717/106 |
| 2008/0022259 A1 | 1/2008 | MacKlem et al. |
| 2008/0022264 A1 | 1/2008 | Macklem et al. |
| 2008/0127128 A1* | 5/2008 | Mateescu et al. ............ 717/139 |
| 2009/0049424 A1 | 2/2009 | Kumar et al. |
| 2009/0204926 A1* | 8/2009 | Cochrane .................... 715/781 |

OTHER PUBLICATIONS

"LabVIEW Tutorial Manual"; Jan. 1996 Edition; National Instruments; pp. 1-29-1-30.

U.S. Appl. No. 12/119,578, entitled "Edit Time Analyzer in a Loosely Typed Textual Language", by Rishi H. Gosalia, Jesse M. Attas, and Bryan A. Marker, filed on May 13, 2008.

"Syntax Highlighting"; Wikipedia; Nov. 1, 2007; Retrieved from Internet: http://web.archive.org/web/20071101101533/http:/en.wikipedia.org/wiki/Syntax_highlighting.

* cited by examiner

EDIT TIME ANALYZER IN A LOOSELY TYPED TEXTUAL LANGUAGE

FIELD OF THE INVENTION

The present invention relates to the field of edit time analyzers, and more particularly to an edit time analyzer in a loosely typed textual language.

DESCRIPTION OF THE RELATED ART

In recent years, loosely typed textual languages, such as those used in technical fields (e.g., MathScript™ from National Instruments Corporation, MATLAB™ from The Mathworks Inc., Mathematica™ from Wolfram Research, PsiLab, etc.) have increased in popularity. Some products allow for minimal syntax analysis (e.g., proper use of parenthesis, built-in function syntax, syntax in general, etc.) and symbol labeling (e.g., identification of built-in constructs, such as a "for" function; built-in constants, such as "pi"; etc.) during edit time. For example, while a user types in code into an editor or editing program, the editor may indicate, for example, whether current brackets or parentheses are closed or should be closed. For example, sets of parentheses which are not currently closed may be displayed in red to indicate that they still need to be closed for proper syntax.

However, current editors for loosely typed languages do not perform more in-depth analysis to provide the user better feedback on code or scripts during edit time. Thus, improvements in edit time analyzers are desired.

SUMMARY OF THE INVENTION

Various embodiments are presented of an edit time analyzer.

User input entering a first portion of a script written in a loosely typed textual language may be received. The first portion of the script may include a single line of code or a plurality of lines of code. In one embodiment, the entire script may be received. In some embodiments, the first portion (or the whole script) may be included in a node in a graphical program, where the graphical program comprises a plurality of interconnected nodes which visually indicate functionality of the graphical program.

Accordingly, the portion of the script may be analyzed. Analysis may include determining one or more code portions referenced by the specified code, determining properties of symbols of the specified code and the one or more code portion, and analyzing the specified code using the determined properties to determine errors in the specified code.

As indicated above, properties of symbols in the first portion and one or more referenced files which call or are called by the first portion may be hierarchically determined. Properties of the symbols may include types of the symbols. The types of the symbols may include functions, constants, data container types, data types, etc. More specifically, the one or more symbols may include functions, and determining properties of the symbols may include determining any side effects of the function other than its respective outputs or whether the function is reentrant. In one embodiment, determining the properties of the symbols may include, for each symbol, determining the numbers of required inputs or outputs as well as types for the required inputs or outputs and determining whether calls to the symbol match the number and types of the required inputs or outputs.

As indicated above, one or more errors, warnings, or other information related to the first portion may be determined based on said hierarchically determining. One or more errors, warnings, and/or other information may be graphically indicated or displayed based on said hierarchically determining.

In some embodiments, the method described above may be performed in an interactive manner, where the errors may be displayed substantially in real time with respect to the user entering the first portion of the script.

Various embodiments may be implemented by a computer program or program instructions stored on a memory medium which may be executable by a processor.

BRIEF DESCRIPTION OF THE DRAWINGS

A better understanding of the present invention can be obtained when the following detailed description of the preferred embodiment is considered in conjunction with the following drawings, in which.

Figure 1A:
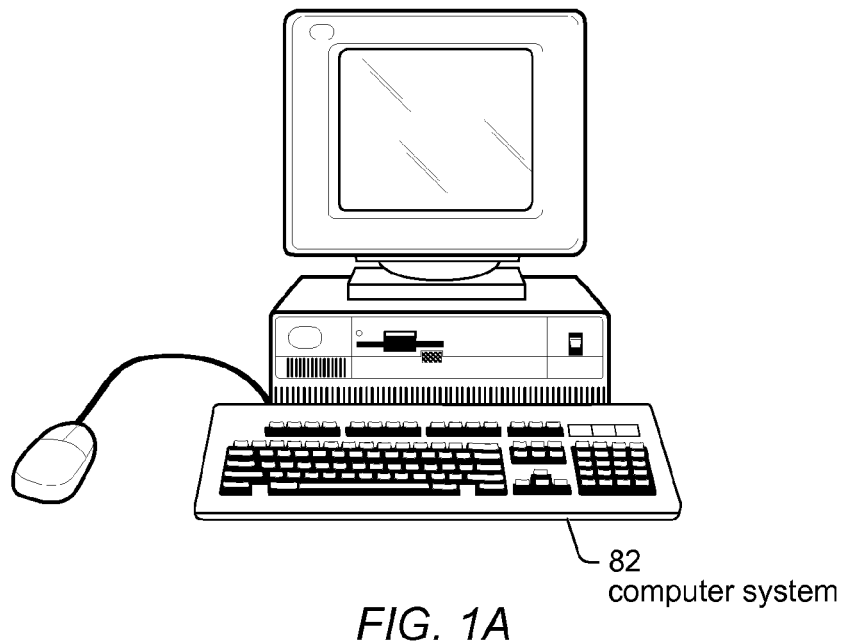
FIG. 1A illustrates a computer system operable to execute a diagram according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to display and/or execute programs/methods described herein. For example, the computer system 82 may be operable to execute a programming language editor and/or edit time analyzer for one or more computer languages (e.g., loosely typed computing languages). In some embodiments, the computer system 82 may be operable to execute a diagram (e.g., a graphical program). Further, the computer system 82 may include a graphical programming development environment which may allow the user to create graphical programs. The graphical program may include one or more nodes including textual code (e.g., in a loosely typed computing language). Correspondingly, the graphical programming development environment may include an edit time analyzer for the one or more nodes including textual code. Thus, embodiments described herein may apply to a edit time analyzer which executes in or separate from a graphical programming development environment.

As shown in FIG. 1A, the computer system 82 may include a display device operable to display the diagram as the diagram is created and/or executed. The display device may also be operable to display a graphical user interface or front panel of a graphical program/edit time analyzer. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more computer language editors, edit-time analyzers, graphical programs, graphical programming environment, etc. that are executable to perform the methods described herein. The memory medium may also store operating system software, and/or other software for operation of the computer system. Various embodiments further include receiving or storing instructions and/or data implemented in accordance with the foregoing description upon a carrier medium.

Figure 1B:
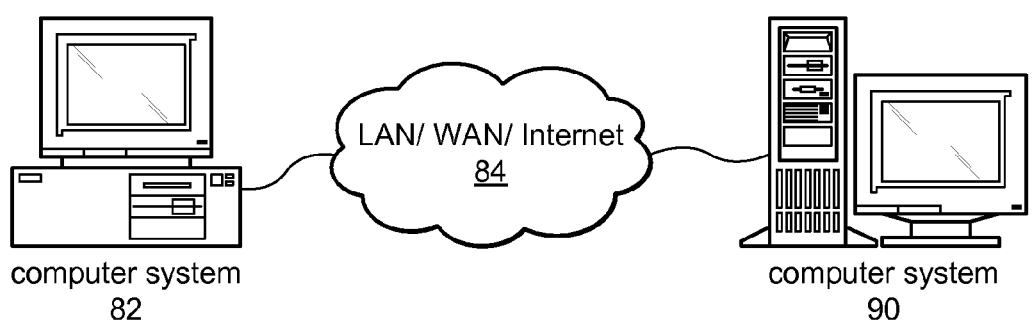
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program or script (e.g., generated in a loosely typed computing language) in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program. Similar descriptions apply to executing scripts in a distributed fashion.

In one embodiment, a GUI of a graphical program or script may be displayed on a display device of the computer system 82, and while at least a portion of the graphical program or script executes on device 190 connected to the computer system 82. The device 190 may include a programmable hardware element and/or may include a processor and memory medium which may execute a real time operating system. In one embodiment, the graphical program or script may be downloaded and executed on the device 190. For example, an application development environment with which the graphical program/script is associated may provide support for downloading a diagram for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc. Additionally, the present invention may be used for any application for which programs (e.g., scripts) may be used.

Figure 2A:
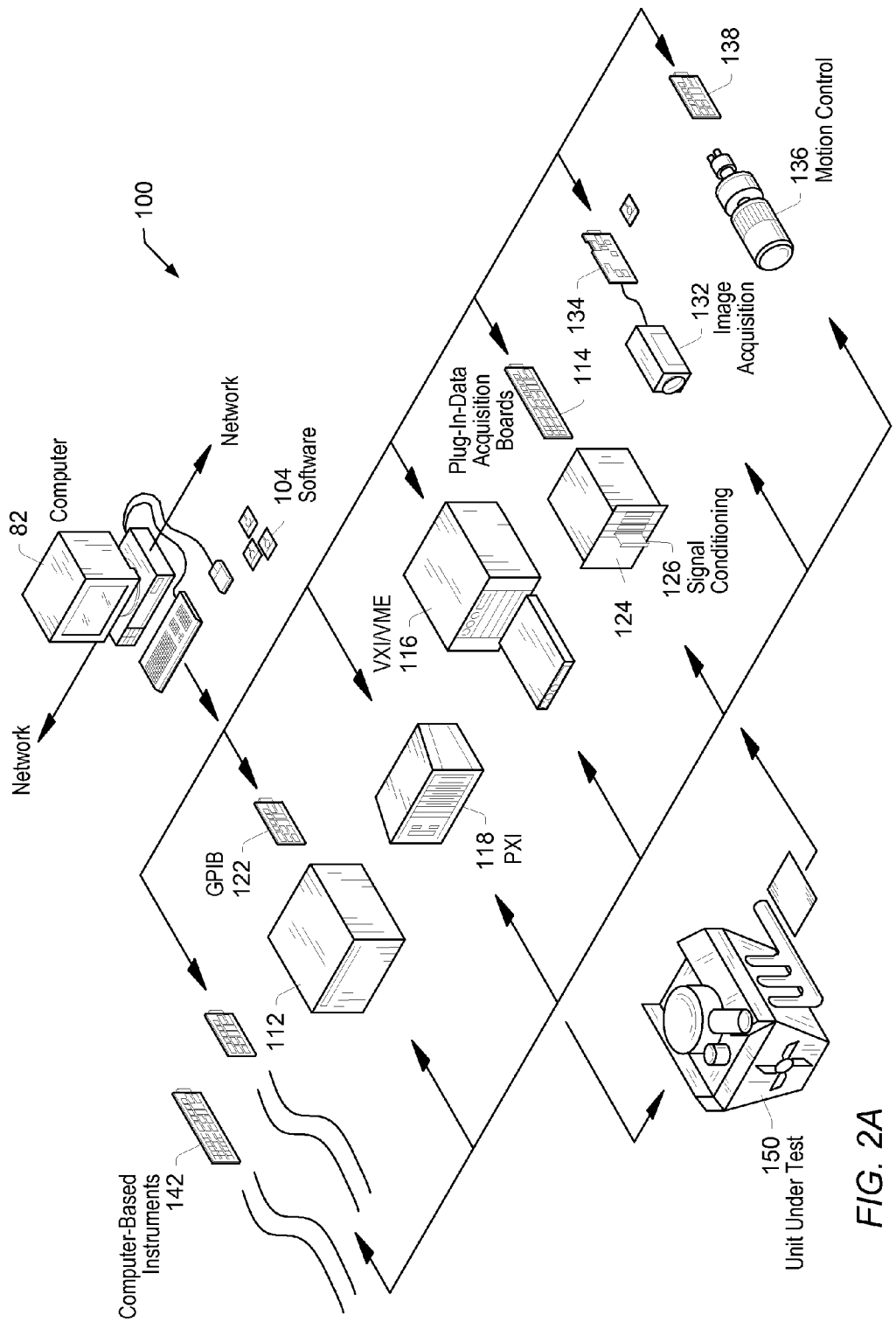
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
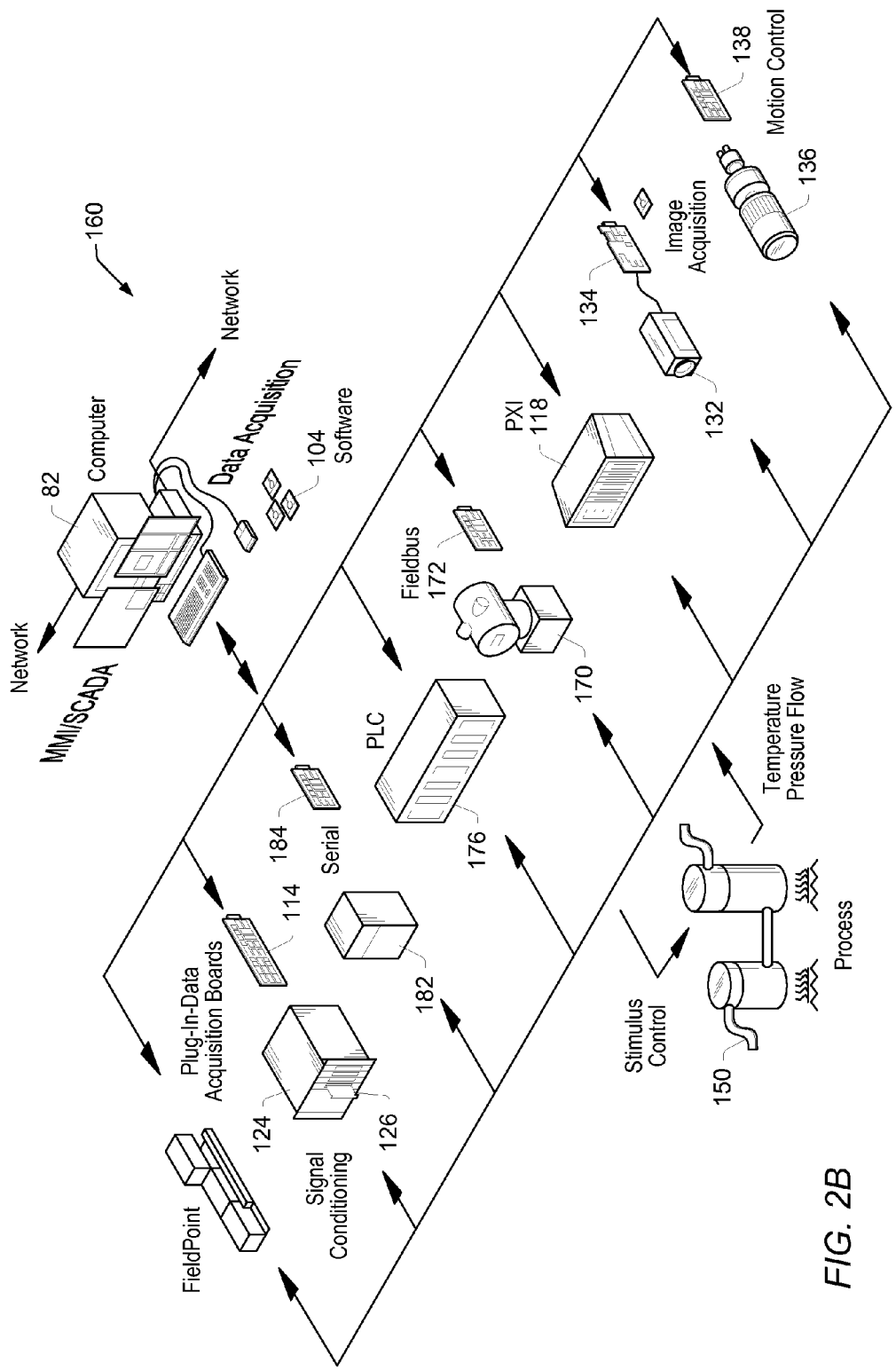
FIG. 2B illustrates an industrial automation system according to one embodiment of the invention.
Figure 3A:
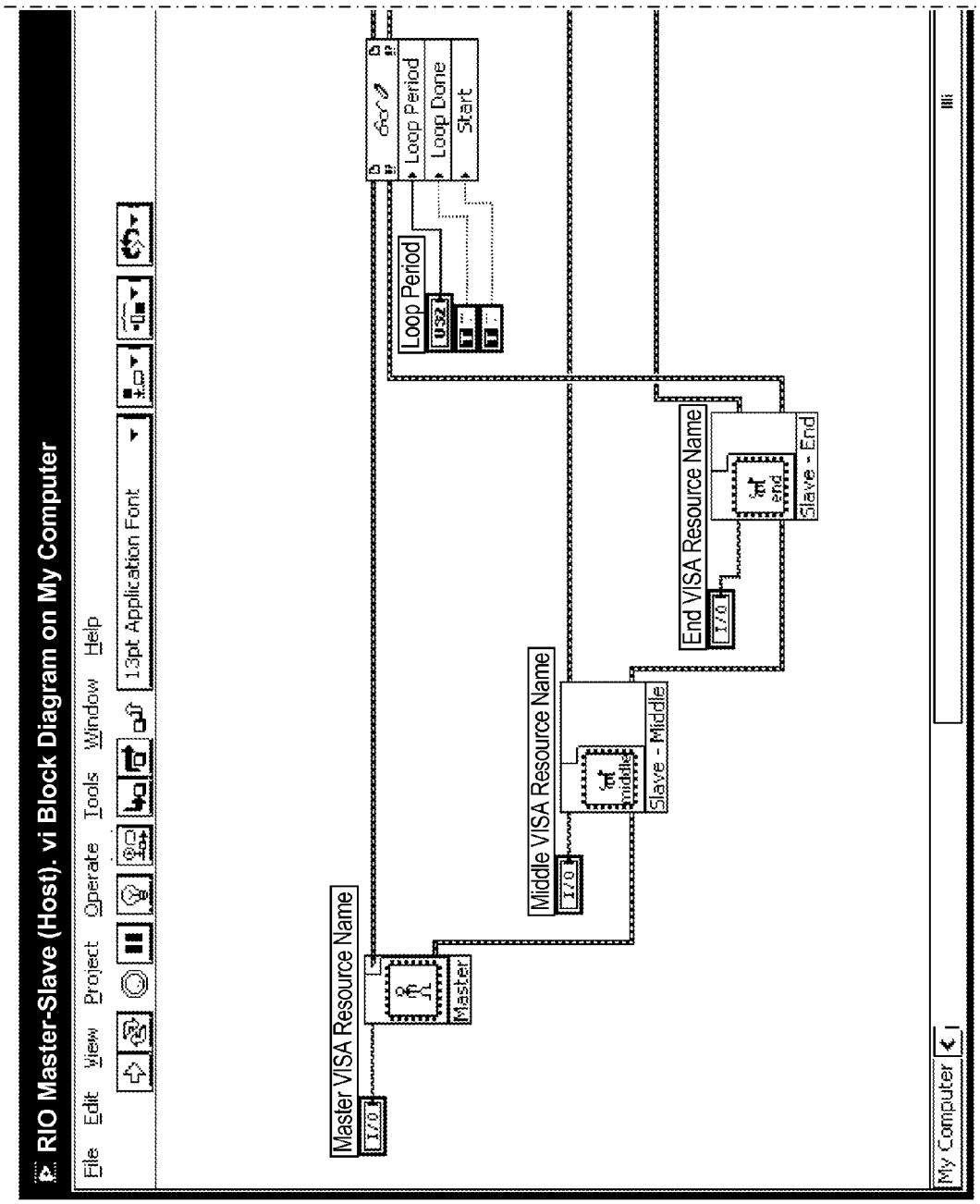
FIGS. 3A-3E are screen shots of an exemplary graphical program according to one embodiment.
Figure 3B:
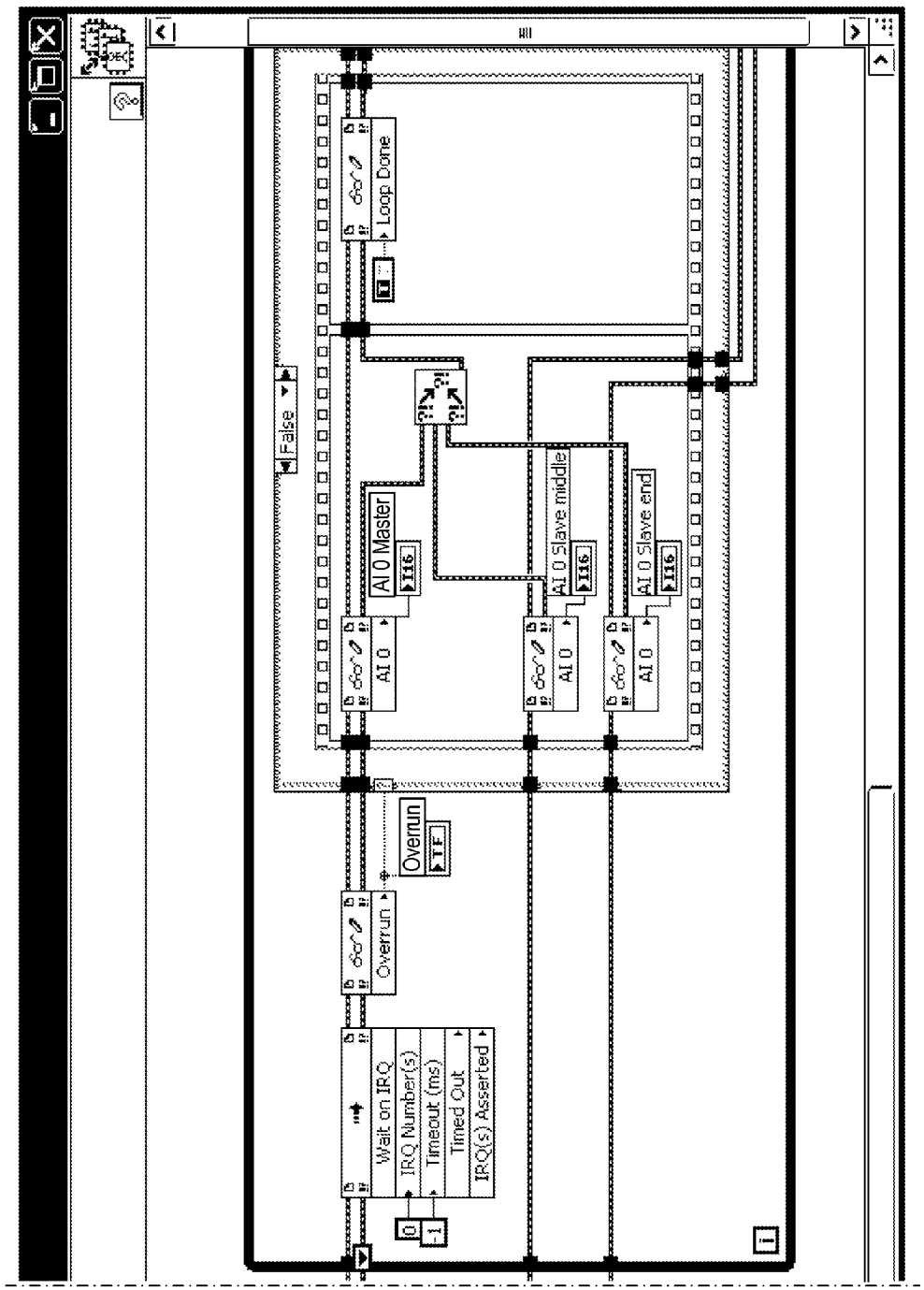
Figure 3C:
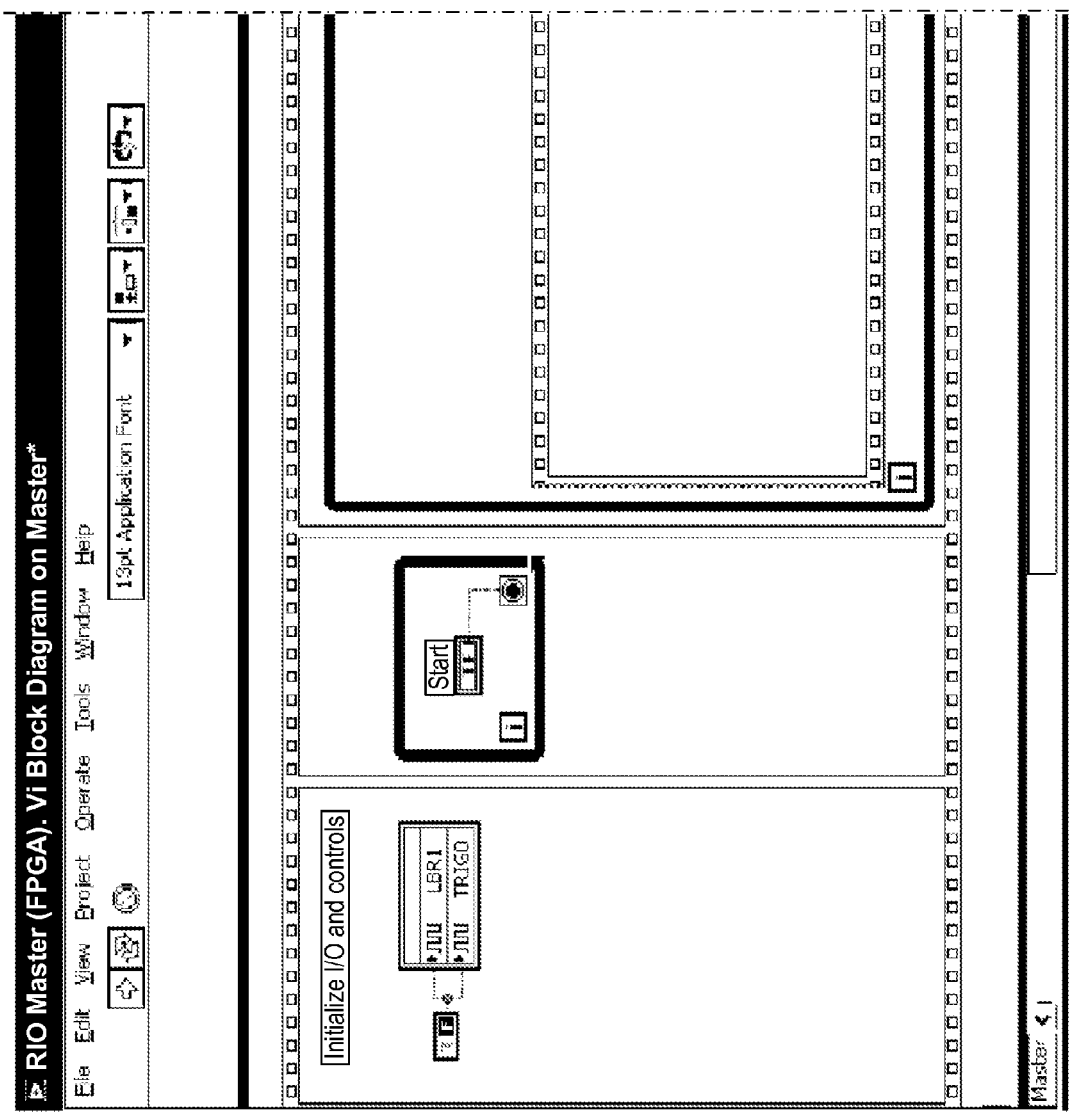
Figure 3D:
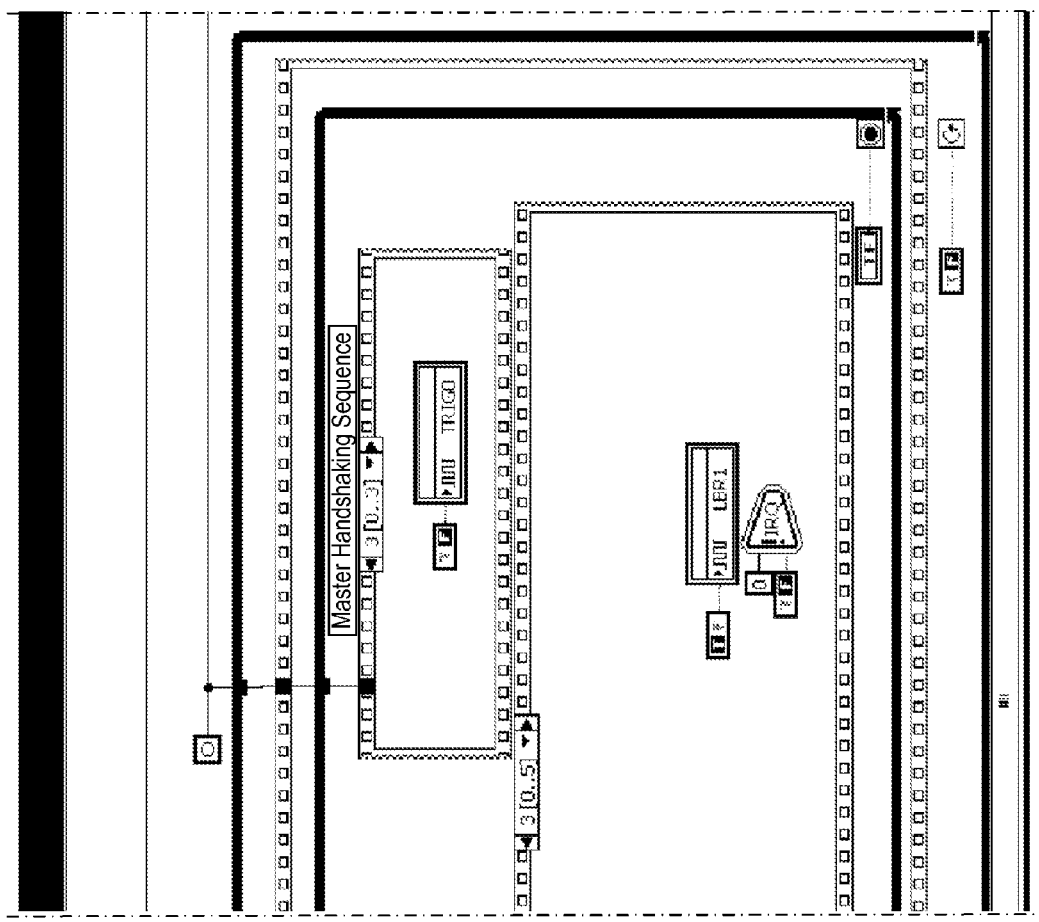
Figure 3E:
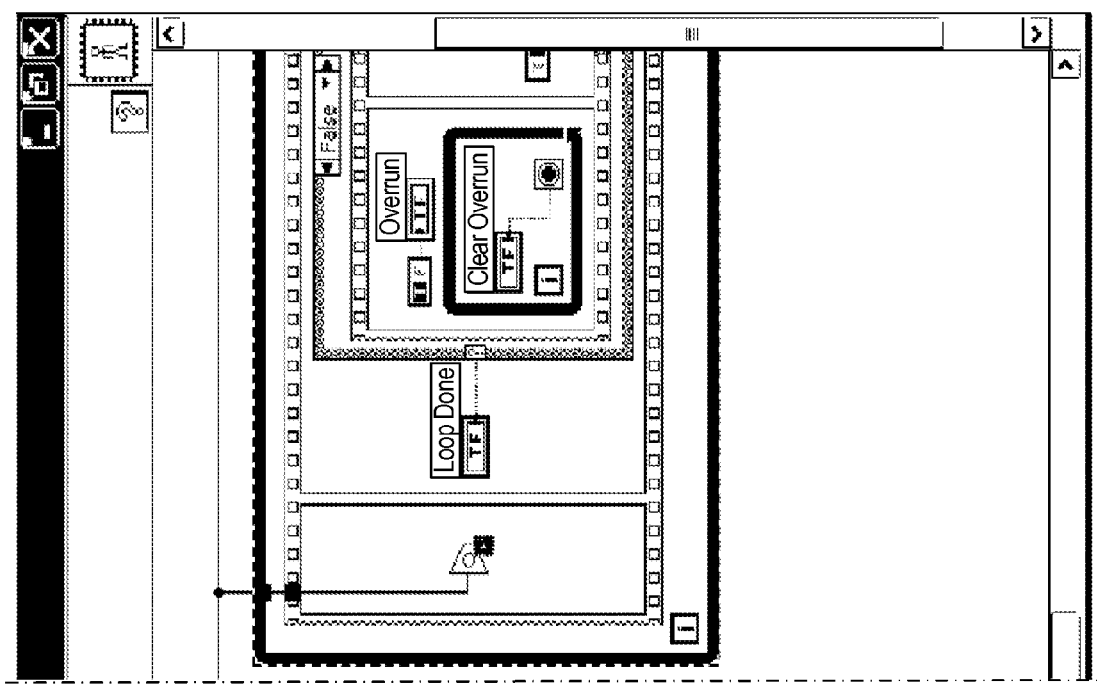

FIG. 2B illustrates an exemplary industrial automation system 160 which may implement embodiments of the invention. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIGS. 3A-3E —Exemplary Graphical Programs

As described above, in some embodiments, a graphical program may include a node or portion which includes text code, e.g., programmed in a loosely typed computing language. Accordingly, the graphical program (or its development environment) may allow for analysis of the text code during edit time (as described below). The following sections describe graphical programs and their operation in general, but it should be noted that in some embodiments may be implemented in a textual environment, such as MathScript™ or MATLAB™, and in these embodiments a graphical program is not necessary. For example, the edit time analysis described below may be performed for a script or program that is not included in a graphical program. In other words, in one embodiment, a script may be analyzed according to embodiment herein regardless if the script or text program is included in a graphical program.

As indicated above, a graphical program may include a block diagram portion and a graphical user interface portion. In some embodiments, the graphical user interface portion may be comprised within the block diagram portion. The block diagram portion may include a plurality of interconnected nodes or icons which visually indicate functionality of the graphical program. Each of the nodes may have one or more inputs and/or outputs for accepting and/or providing data to other nodes in the graphical program. Each of the nodes in the graphical program may represent software functions or executable code. In other words, the nodes in the graphical program may represent or comprise logical elements (e.g., virtual instruments (VIs), primitives, etc.)

As also indicated above, the nodes in the graphical program may be interconnected by lines or wires which indicate that indicate that data are provided from a first node to a second node in the graphical program. In some embodiments, the wires may be connected to the terminals of nodes in the graphical program. The terminals may provide connection points for connecting the wires to a node, e.g., to individual inputs or outputs of the node. In some embodiments, wires which indicate transfer of data may be referred to as data transfer wires.

In some embodiments, the graphical program may include one or more structure nodes which indicate control flow among one or more nodes in the graphical program. For example, the graphical program may include a conditional structure node (e.g., to implement conditional branching, if statements, switch statements, signal routing, etc.), a looping structure node for implementing looping among one or more nodes (e.g., while loops, do while loops, for loops, etc.), and/or other control flow nodes.

The graphical program may be created or assembled by the user arranging on a display (e.g., of the computer system 82) a plurality of nodes or icons and then interconnecting the nodes to create the graphical program. In some embodiments, the user may select icons and/or wires from various palettes shown in a development environment on the display. In response to the user assembling the graphical program, data structures may be created and stored which represent the graphical program. As noted above, the graphical program may comprise a block diagram and may also include a user interface portion or front panel portion. Where the graphical program includes a user interface portion, the user may optionally assemble the user interface on the display. As one example, the user may use the LabVIEW development environment to create the graphical program.

FIGS. 3A-3E illustrate exemplary portions of a graphical program according to one embodiment. As shown, the graphical program includes a plurality of interconnected nodes which visually indicates functionality of the graphical program.

Thus, the plurality of interconnected nodes may visually indicate functionality of the graphical program. In other words, during execution of the graphical program, the functionality represented by the plurality of interconnected nodes may be performed.

Figure 4:
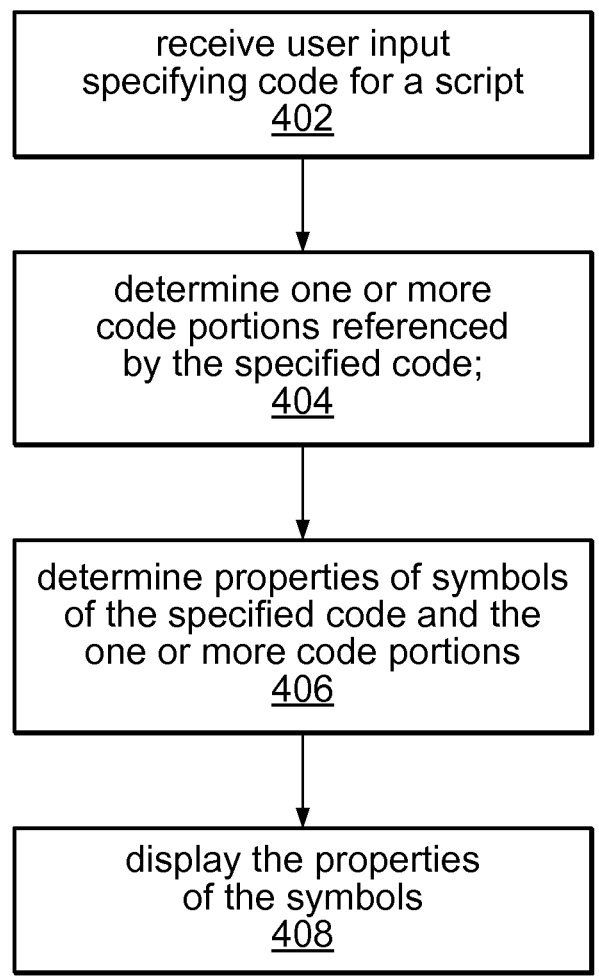
FIG. 4 is a flowchart diagram illustrating one embodiment of a method for configuring wires in a diagram.

FIG. 4—Edit Time Analysis of a Program

FIG. 4 illustrates a computer-implemented method according to one embodiment. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, input specifying code may be received. The code may be specified in a loosely typed computing language and may be specified by a user. Exemplary loosely typed languages, such as those used in technical fields, e.g., for testing and development, include MathScript™, MATLAB™, Mathematica, and PsiLab, among others. In such languages, the user may enter or otherwise specify code largely devoted to the manipulation of mathematical equations. For example, the user may type the code into a command line displayed on a display using a keyboard. In one embodiment, the code may be specified in a node (e.g., a textual code node) in a graphical program. The specified code may be a complete script (e.g., included from a file) or may be a portion of a script (e.g., where a user provides one or more lines of code or portions of lines of code). The specified code may be particularly devoted to the manipulation of mathematical or scientific equations (e.g., for modeling, testing, development, etc.). In some embodiments, every line or the majority of the lines of code may be devoted to this purpose. Thus, input specifying the code may be received.

In 404, one or more code portions referenced by the specified code may be determined. For example, the specified code may include a function call to one or more functions which are stored in other scripts (e.g., m-files) and/or other graphical programs. For example, the specified code may include a call to a function 'foo' which is defined in a script (e.g., an m-file). Alternatively, the specified code may include a call to a function which is defined as a VI in a graphical programming language (in other words, the function is defined in graphical code). Note that these functions may be stored in locations other than in scripts or as VIs. Note further that the one or more portions may include files in any level of a hierarchy of files. For example, a function referenced in the specified file may be stored in a first script file, but the definition of the function may use another constant or function that is defined in a second script file. Thus, the function of the specified code may refer to functions in a hierarchy of files or definitions.

Additionally, references other than functions may be determined, e.g., to variables or constants defined in other scripts or locations. For example, a file may store common math constants such as 'pi' or 'NaN' which may be referenced in the specified code by using the constants. For example, 'pi' may be referenced by using 'c=2*pi*r' in the specified code. Thus, code portions referenced by the specified code may be determined.

In 406, properties of the symbols of the specified code may be determined. Additionally, properties of symbols of the one or more code portions may be determined. In other words, the properties of the symbols (or entire lines of code) of the specified code and the properties of symbols referenced in the one or more code portions (e.g., in a hierarchy of files or definitions) may be determined. Thus, in one embodiment, as indicated above, a function call to a first function in the specified code may be defined in a first script file which includes a function call to second function defined in a second script file. Properties of the symbols of the first and second script files may be determined. These properties may be limited to only the referenced portions (e.g., the called functions) or the entirety of the files, as desired.

Properties of symbols may include the type of the symbols, e.g., built-in functions, user functions, built-in constants, variables, etc. Properties may further include whether the symbols are defined or undefined and/or the data type(s) of the symbols (e.g., that a variable is a 32 bit integer). For example, a variable or function may be determined to be undefined if no referenced files (e.g., files included in a path and/or in a graphical program containing or referenced by the specified code) include or define the variable or function.

Furthermore, properties of the symbols may include the number of parameters that are expected as input and as output. Following the example above, the function 'foo' may be defined in a separate script file (e.g., an m-file); correspondingly, determination of properties may include the determination that the function 'foo' should receive two parameters as input and provide one parameter as output. Similar remarks apply to constants and built-in functions. Thus, properties of symbols may be determined in the specified code and portions of code referenced by the specified code.

In some embodiments, the properties of the symbols may be used to analyze the specified code. Following the example from above, the symbols 'c=foo(a,b)' (e.g., found in the specified code) may be resolved to be a function 'foo' (e.g., as defined by script files in the call path), and three variables, 'a', 'b', and 'c'. The required parameters for the function 'foo' (e.g., as determined by analyzing a script in the call path) may have been determined, in 406, to be two for input and one for output. Thus, the properties of the symbols may be used to determine if the semantics of the symbols in the specified code are accurate. In this case, the line of code 'c=foo(a,b)' can be determined to be semantically correct by comparing the properties of the variables, the definition of the function, and the specific semantics used in the specified code. In other words, it can be determined that the assignment of a the variable 'c' to the output of the function 'foo' with parameters 'a' and 'b' is accurate since the function 'foo' is defined as able to receive two inputs and provide one output.

Note that type checking may also be used to make sure the correct types of inputs and outputs of the function are used in the specified code. For example, if 'foo' receives two integers and provides a string, the types of 'a', 'b', and 'c' may be compared to the expected/required types to determine accuracy.

Determining properties of the code may include determining whether a function has any side effects other than its output (e.g., file writing) or whether it is reentrant (safely callable by two threads without blocking). Thus, the properties of the symbols of the specified code and the referenced one or more portions may be used to analyze the specified code.

However, it should be noted that the method may include determining whether or not the specified code (e.g., the semantics of the specified code) can be analyzed. For example, it may be possible that definitions of functions, variables, constants, etc. may be received at run time. More specifically, the script may receive input which may define a variable which is currently undefined. Thus, if such input can be received, it may be determined that the specified code cannot be properly analyzed, or that the analysis/properties of the specified code may not be accurate or the same at run time.

Furthermore, syntax errors may be determined for the specified code. For example, parenthetical checking (i.e., making sure all open parentheses have been closed) may be performed, definition checking (e.g., structure for definitions of functions), built-in constructs checking (e.g., proper form use of for loops, while loops, etc.), and/or other syntax checking may be performed.

In 408, the determined properties and/or results of analysis based on the properties may be displayed. For example, each different property of the specified code may be indicated for the user. In one embodiment, undefined symbols, functions (e.g., built-in functions, user defined functions, and/or graphical programs (such as VIs)), variables, constants (e.g., built-in or user defined), etc. may each (or subsets of may) be displayed in a unique color. Alternatively, or additionally, formatting (e.g., underlining, bolding, italicizing, etc.) may be used to indicate the different types of symbols. Note that these indications are exemplary only and others are envisioned.

Displaying the results of the analysis may include displaying errors found in the specified code (and/or the one or more referenced code portions). For example, syntax or semantic errors may be displayed to the user via text coloring or formatting (e.g., making an unclosed parentheses red). Alternatively, or additionally, errors may be displayed via a pop-up window or hover window (e.g., where the user hovers a cursor over the portion of code with the error or an error icon in the specified code) in the development environment. In one embodiment, the errors may be displayed as a list of errors, possibly in a window or error portion of the development environment.

In one embodiment, the displayed errors may be displayed or indicated hierarchically. For example, where the one or more referenced code portions include a reference to an undefined symbol (or otherwise have errors), these errors may be indicated to the user on the display in a manner which indicates where the error occurs. For example, where the specified code references a function which uses an undefined variable, an error may be displayed which indicates that the error is in the referenced file or function and not the specified code. For example, an error make be displayed which states "variable x is undefined in foo.m, referred to by the function call foo(a,b)", indicating that the function 'foo' was defined in foo.m, but the variable 'x' was undefined in that reference. Thus, the user may be able to view errors hierarchically. Various techniques may be used to indicate the hierarchy, e.g., overlapping windows, tree views, etc. Note that the above-described presentations of errors are exemplary only and that others are envisioned.

In one embodiment, if the specified code cannot be properly analyzed for run time, a warning glyph (or other indication) may be displayed in or proximate to the specified code. As used herein, if two objects are displayed 'proximate' to each other, they are displayed in such a way that an association between the two objects can be visually understood by a user. For example, two icons may be proximate if they are displayed within a certain radius of pixels (e.g., 1-50), cm (e.g., 1-10), or inches (e.g., 0.1-1.5). The properties/results of the analysis described above may or may not be displayed in addition to this warning glyph or other indication.

Thus, the determined properties and/or results of the analysis may be displayed.

Note that the above described method may be performed interactively, i.e., as the user types in a line of code, the determination and analysis of the referenced code and the semantics/syntax of the code (referred to as the "edit time checking") may be performed, and the display of the resulting analysis may occur. The term "interactively" thus refers to performing the edit time checking such that the user is given feedback substantially in real time, e.g., without a significant delay from when the user typed in the code being analyzed. Thus the edit time checking may be performed while the user is typing in the line of code or within a certain short period of time after the user has finished typing in the line of code. In one embodiment, the edit time checking is performed within 2 seconds of the user having typed in the line of code. In another embodiment, the edit time checking is performed within 1 second of the user having typed in the line of code.

Alternatively, or additionally, the above described method may be performed periodically or with a larger amount of code. For example, instead of being performed while the user types in the code interactively, the code may be analyzed per above after every few number of lines of code, when the code has not been changed for a period of time (e.g., a few seconds, minutes, etc.), when the user is actively editing something else (e.g., another portion of the graphical program), when the code specification window or node is no longer activated, and/or upon other conditions. Thus, the above method may be performed under various conditions during edit time. Note that the descriptions regarding when or how edit time checking is performed apply to the following descriptions and examples.

Note that while embodiments described above relate to loosely typed languages and programs or scripts thereof, similar methods may be applied to other programming languages and environments. For example, similar methods may apply to text-based programming languages such as C, C++, Java, etc.

FIGS. 5A-9B—Exemplary Scripts and Edit-Time Analyses

FIGS. 5A-9B are exemplary scripts and edit-time analyses, e.g., according to the methods described above. Note that these Figures are only examples and are not intended to limit the above-described methods in any way whatsoever.

Figure 5A:
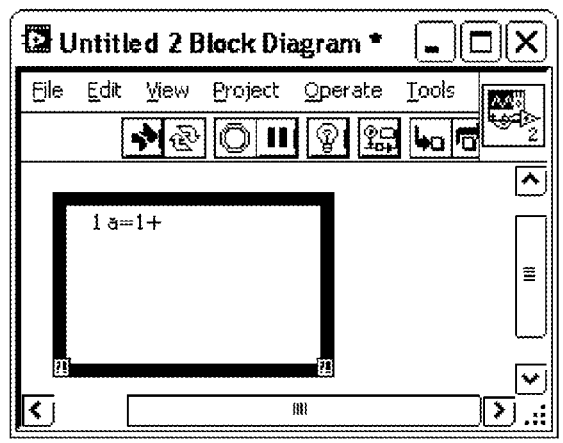
FIGS. 5A-11C illustrate exemplary text code (e.g., nodes in graphical programs) with corresponding errors or other indications according to various embodiments.
Figure 5B:
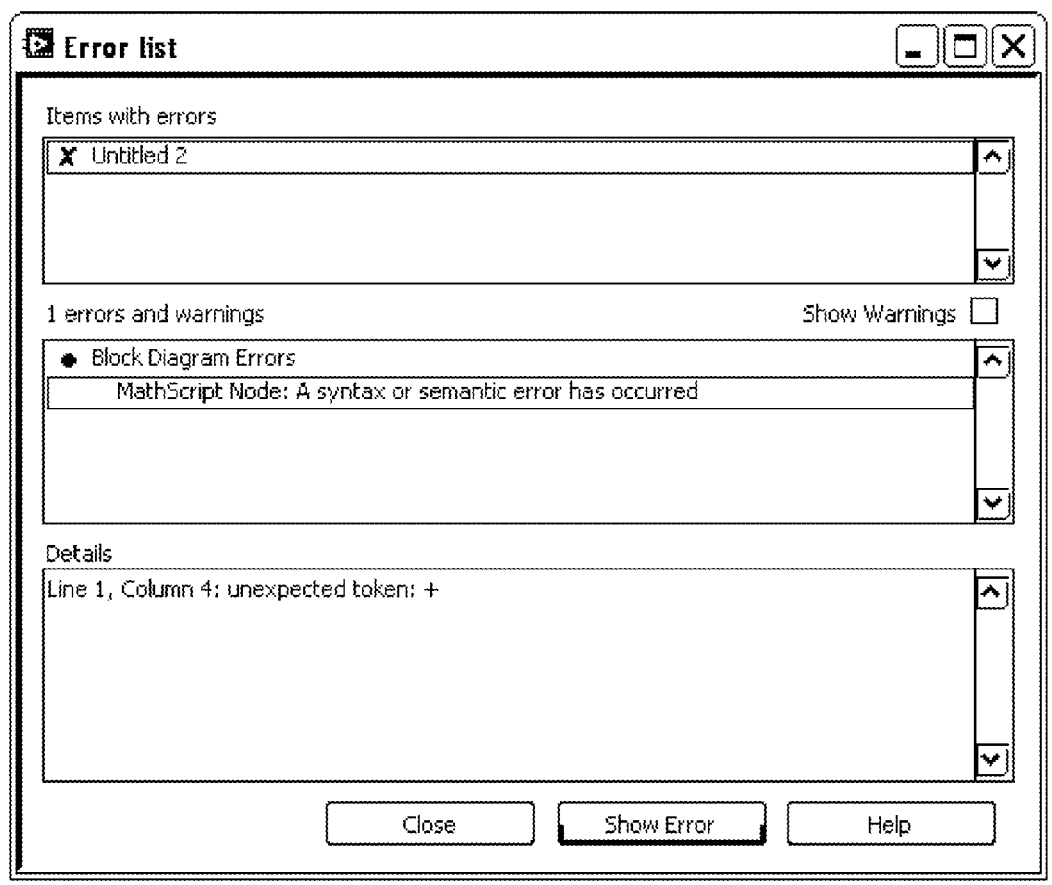

FIG. 5A illustrates an exemplary text code node in a graphical program. As shown, the first line of the text in the script of the node is "a=1+". Accordingly, FIG. 5B illustrates a corresponding error which may be shown at edit time, e.g., after the user has pressed "return" or otherwise left focus from the text code node in the graphical program, among other possible variations, such as those described above. In this case, the error indicates that a syntax error has occurred. More specifically, FIG. 5B indicates that the MathScript Node has a syntax or semantic error, and in the details box, specifically states "Line 1, Column 4: unexpected token: +". Similar errors may be detected and reported for other syntax errors such as, for example: "A=foo(1," (improper parentheses), "for i=1" (improper for format), etc. Thus, FIGS. 5A and 5B illustrate an exemplary graphical program with a text node include a syntactical error, and an exemplary resulting edit time analyzer error message. Note that various other methods for indicating the error are envisioned.

Figure 6A:
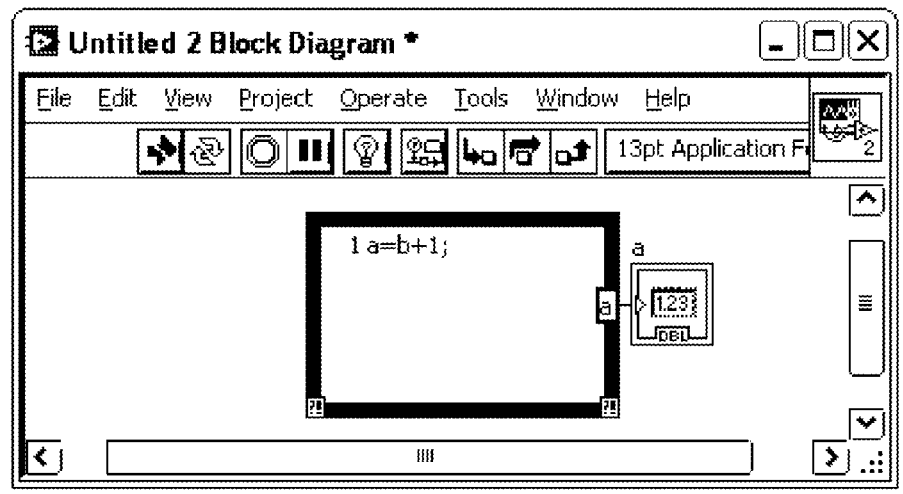
Figure 6B:
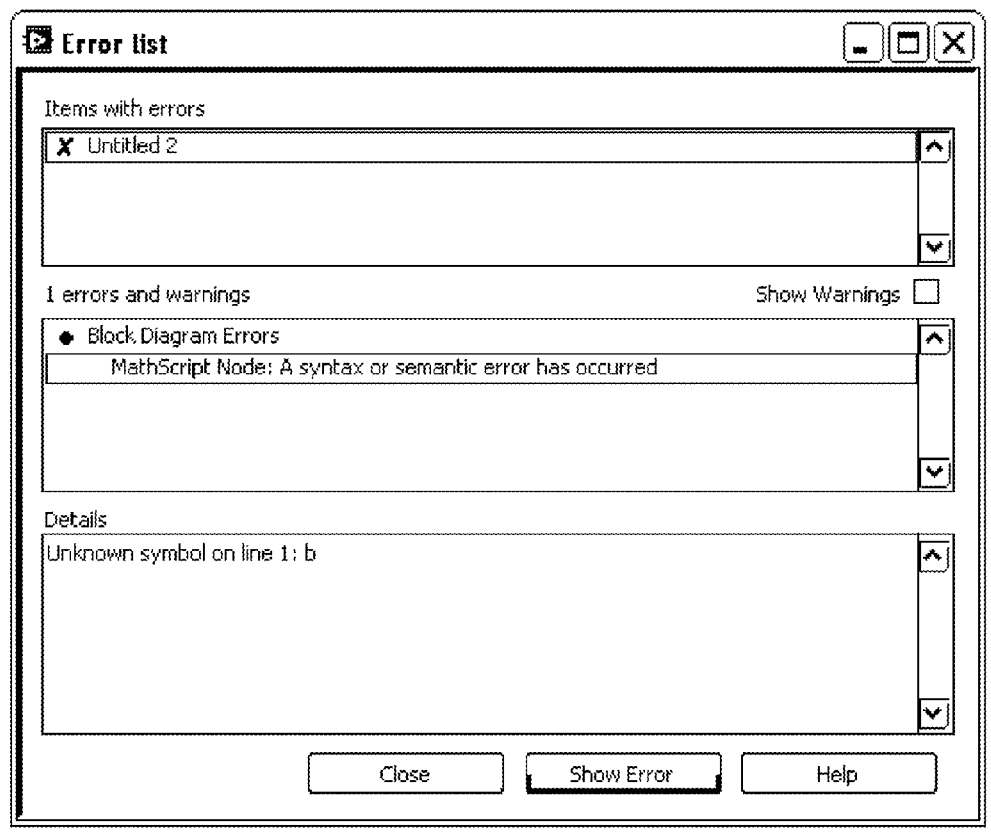

FIG. 6A illustrates an exemplary text code node in a graphical program. As shown, the first line (and only line) of the text of the node is "a=b+1". As shown, the text code node is connected to a double node (which receives the output of the variable a). When the edit time analyzer checks this code, the exemplary error shown in 6B may be displayed. As shown, the error indicates that the variable b is unknown. This error may indicate that there is no other script (e.g., m-file) named b.m in the current search path, there is no built-in function named b, there is no built-in constant named b, and there is no known variable in the current script named b. Thus, this error in the text code node may be determined and displayed before compile time in this graphical program. In this case, the edit time analyzer may determine semantic errors as well as simpler syntax errors (such as the one illustrated in FIG. 5).

Figure 7A:
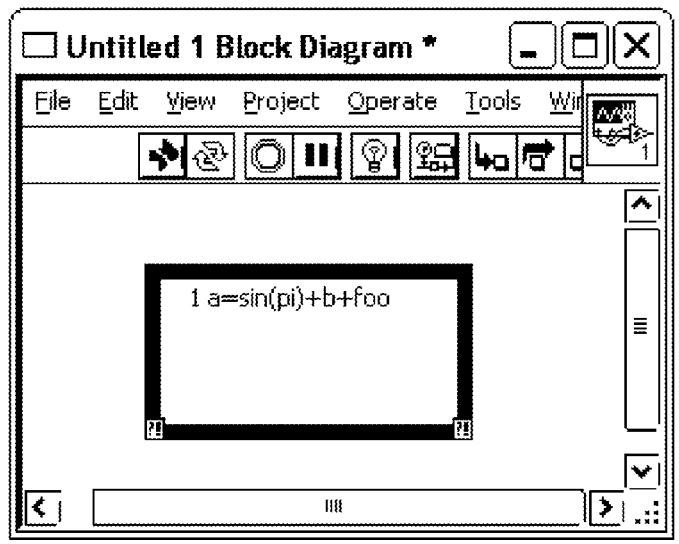

FIG. 7A illustrates an exemplary text code node in a graphical program which illustrates exemplary color labeling and identification of different types of symbols in the code. In this case, the first line of code is "a=sin(pi)+b+foo". Although shown only in black and white here, 'a' is shown in red (indicating it is a variable), 'sin' is shown in blue (indicating it is a built in function), 'pi' is shown in orange (indicating it is a built-in constant), 'b' is shown in purple (indicating it is an undefined symbol), and 'foo' is shown in green (indicating it is a user-defined function). Thus, the different types of the code may be determined and possibly indicated (e.g., via colors such as those described above) during edit time (e.g., as the user types the code, after line completion, and/or after the text code node loses focus). An error code similar to FIG. 6B may have been showed for this code since 'b' has been determined to be undefined. Thus, FIG. 7 illustrates an exemplary text code node which has been analyzed to determine types of the symbols in the code and has been displayed accordingly (in this case with different colors for each type).

Figure 7B:
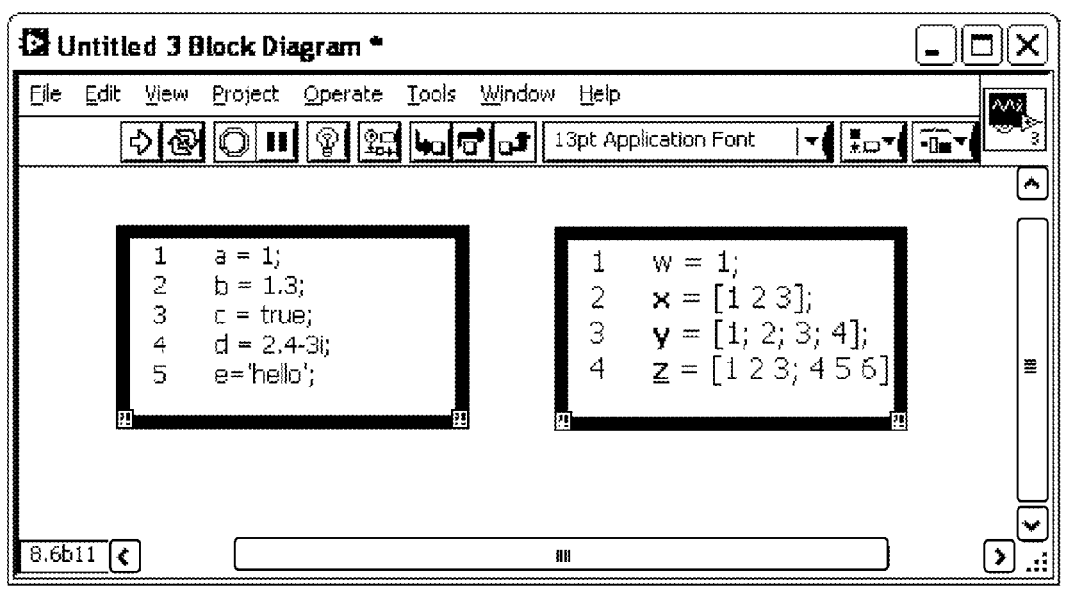

According to another scheme, variables of different representations could be automatically drawn in different colors while variables of different array dimensions could be automatically drawn in different styles (e.g., bold, italics, etc.). For example, integers could be blue, doubles and complex doubles could be orange, Booleans could be green, and strings could be pink while scalars could be plain text, vectors could be bold, and matricies may be bold and underlined, e.g., as indicated in FIG. 7B.

Figure 8A:
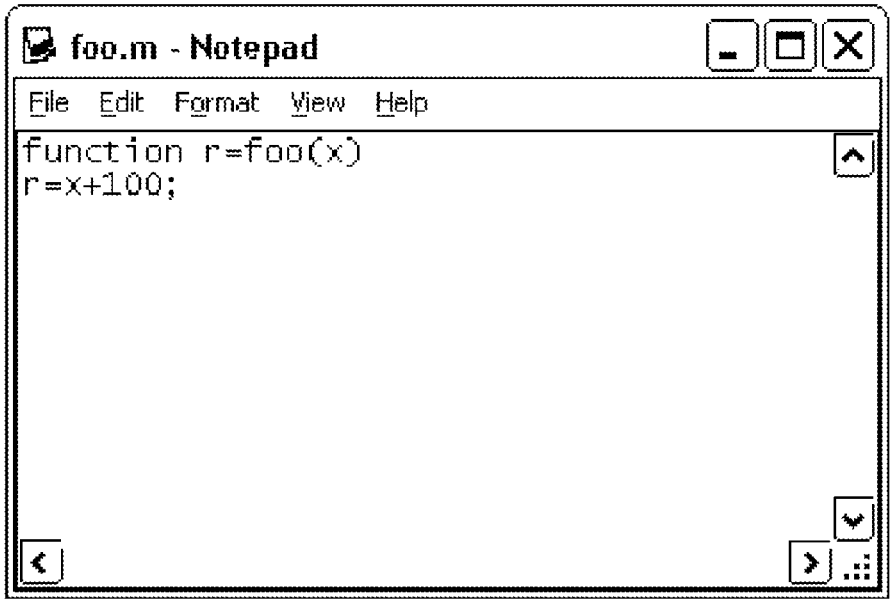
Figure 8B:
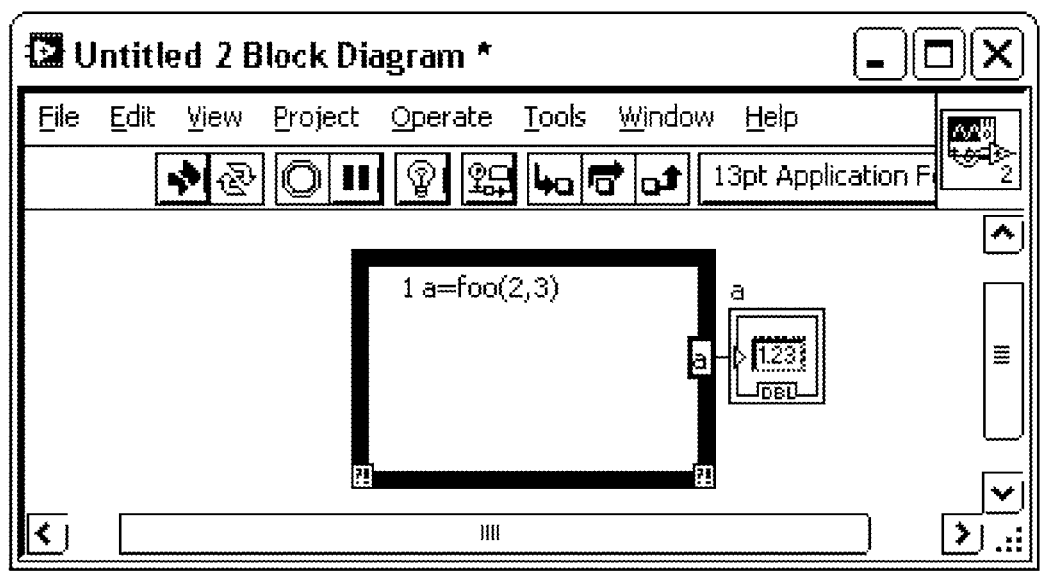
Figure 8C:
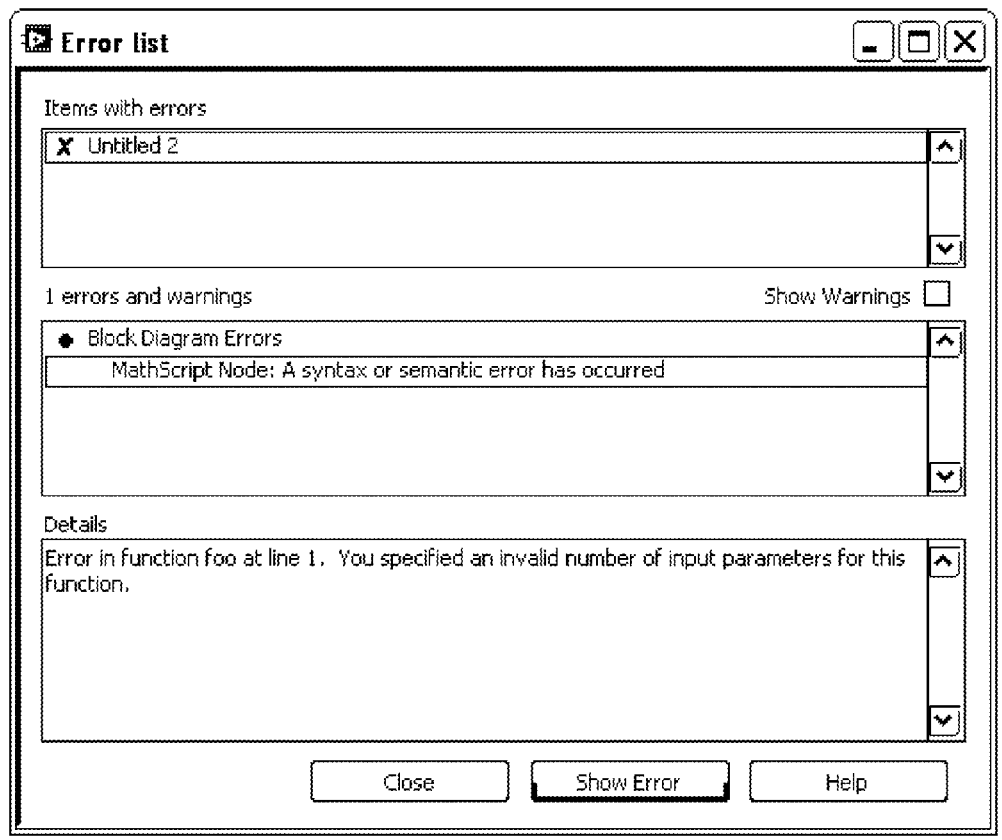
Figure 8D:
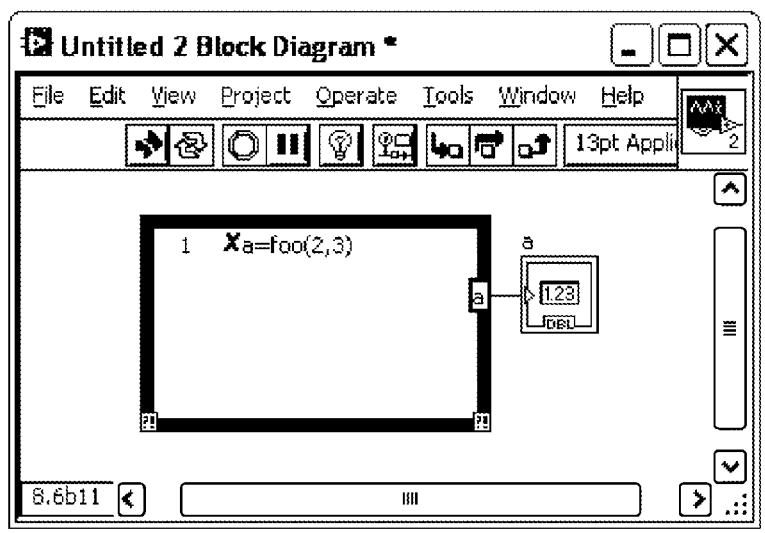

FIG. 8A illustrates an exemplary script file "foo.m" which includes two lines of code, in this case, "function r=foo(x)" and "r=x+100". Thus, the function 'foo' is defined to receive either zero or one input. This file may be included in a search path for the text code node shown in 8B, with code "a=foo(2, 3)". Thus, the text code node includes a call to foo with two inputs, which is semantically incorrect. Correspondingly, FIG. 8C illustrates an exemplary error (displayed during edit time) which indicates that an invalid number of input parameters were specified for the function foo at line 1. FIG. 8D illustrates another way for giving feedback about errors and warnings. In this case, a glyph "x" may be displayed next to line 1 indicating that there is an error associated with the line of code. Such feedback may be provided immediately, being updated with every keystroke at edit time.

Figure 8E:
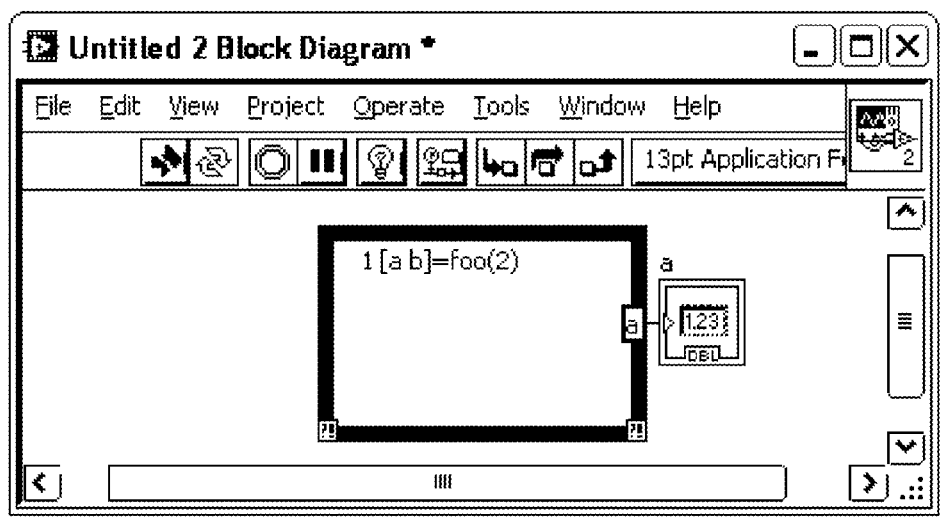
Figure 8F:
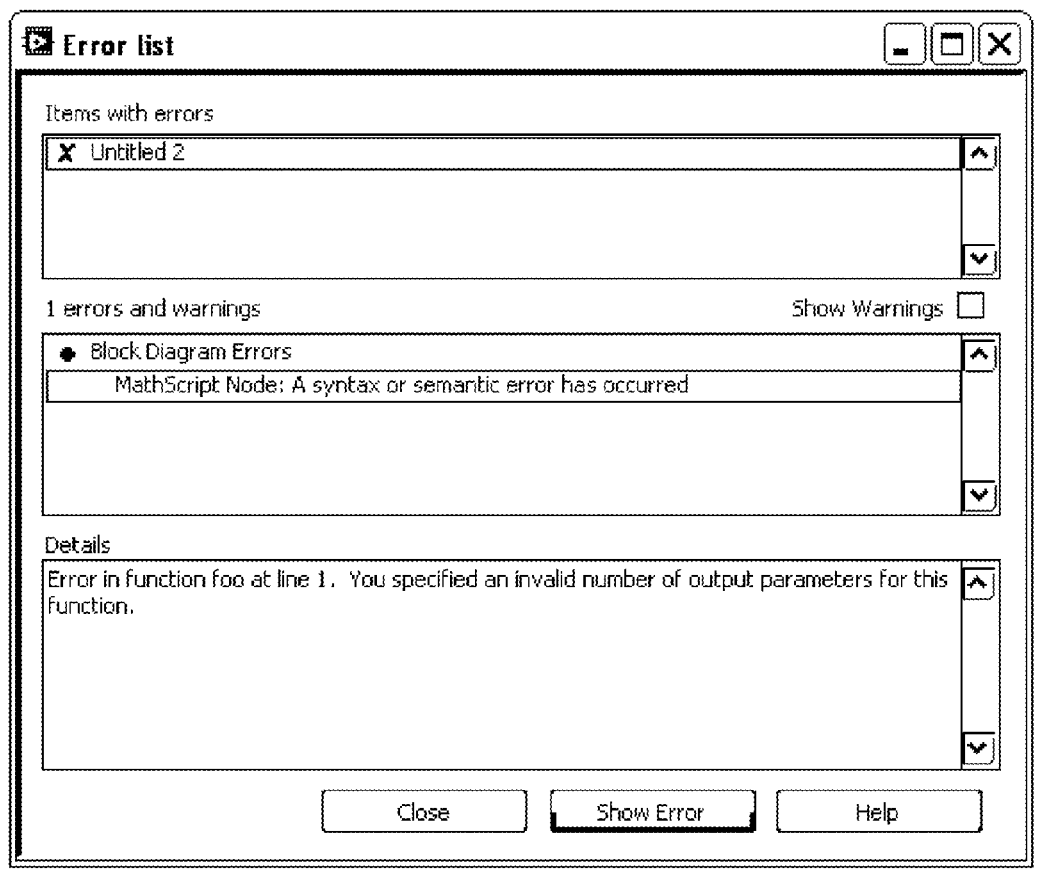
Figure 8G:
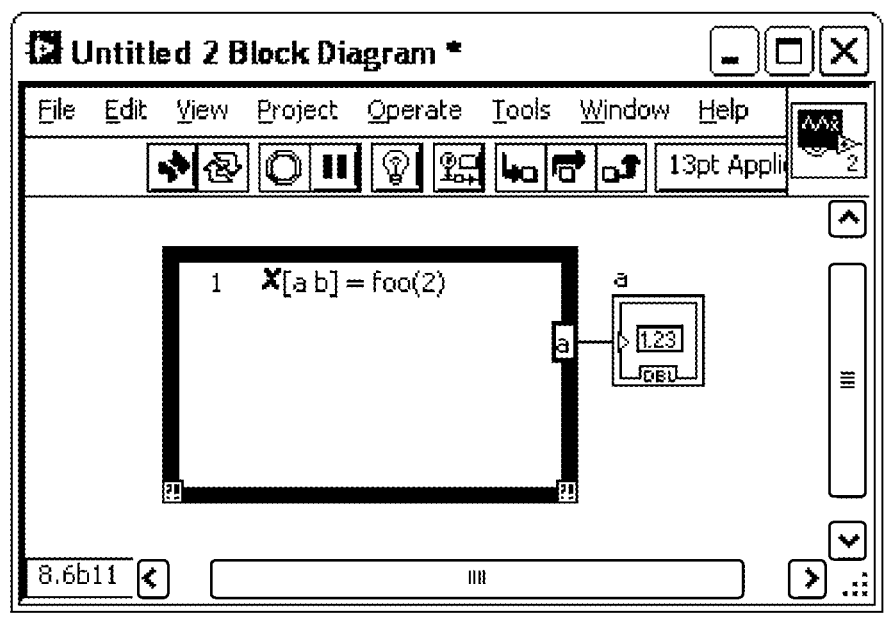

FIG. 8E illustrates a text code node with code '[a b]=foo (2)'. Thus, the text code node includes a call to foo with one input (which is correct), but assigns the output to two variables, a and b. As defined in 8A, the function foo only provides one output, so this statement is semantically incorrect. Correspondingly, FIG. 8F illustrates an exemplary error for the text code shown in FIG. 8E. In this case, the error states "Error in function foo at line 1. You specified an invalid number of output parameters for this function". Similar code as 8E and error 8F may be displayed if the built-in function sin replaced the function foo, as it receives 0 or 1 inputs and provides 0 or 1 outputs. FIG. 8G, similar to FIG. 8D above, shows another way of indicating the error to the user, using a glyph icon of an x. Similar to above, the glyph may be displayed while the user types the line of code or when the line of code is fully specified, as desired. Thus, edit time analysis may include analysis of inputs and outputs of called functions. Similar checking may be performed for constants (which generally receive 0 inputs and provide 1 output).

Figure 9A:
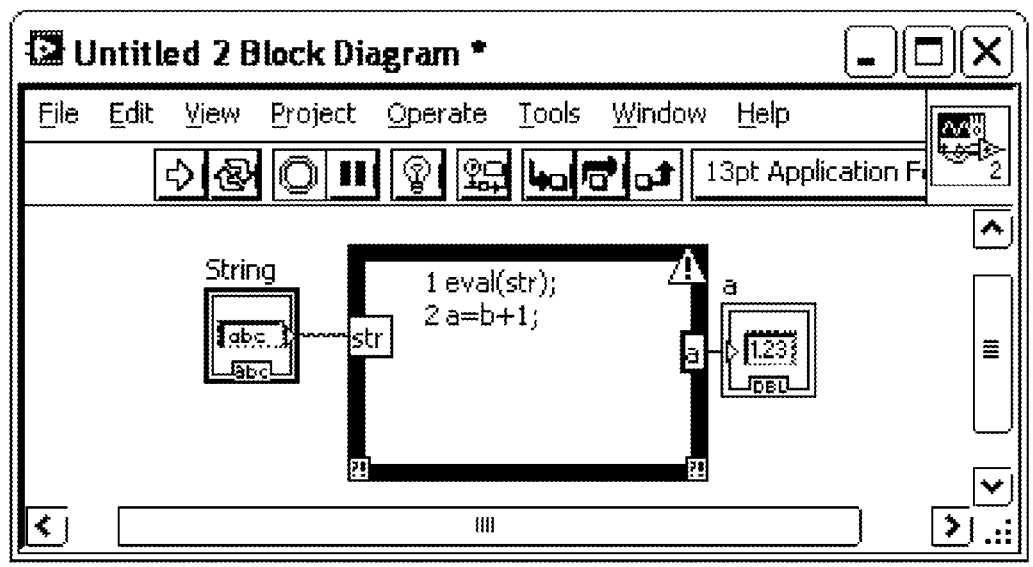
Figure 9B:
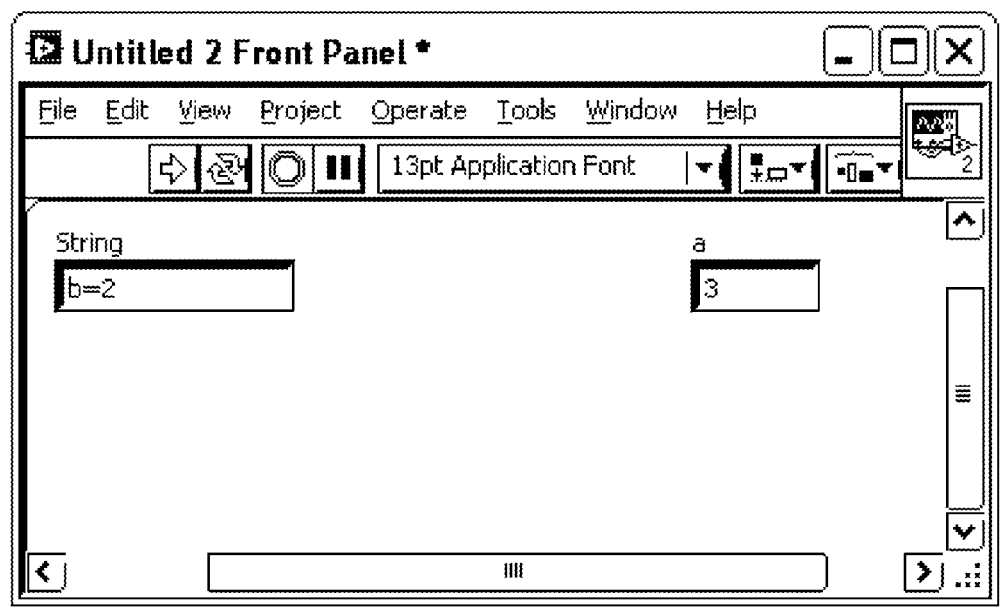

FIG. 9A illustrates an exemplary graphical program with a text code node which receives a string as an input 'str', and provides output 'a' as a double. The text of the text code node is "eval(str); a=b+1;", which appears to be semantically incorrect as the variable b is not defined. However, this may or may not be the case since the value of 'str' is unknown at edit time. FIG. 9B illustrates an exemplary front panel for the graphical program of FIG. 9A. As shown, a user may provide input to the graphical program via the "string" field in the front panel. This input operates to define the variable 'str'. In this case, the provided input "b=2" makes the code of the text code node in FIG. 9A semantically correct; however, this information cannot be known at edit time. Correspondingly, the edit time analyzer may indicate that the code in the text code node may not be properly analyzed at edit-time(in this case, due to the eval function). A warning icon may be shown, such as exclamation point icon shown in the upper right hand corner of the text code node, or in a margin indicating next to the line that has the function that makes analyzing the script not possible at edit-time.

Figure 9C:
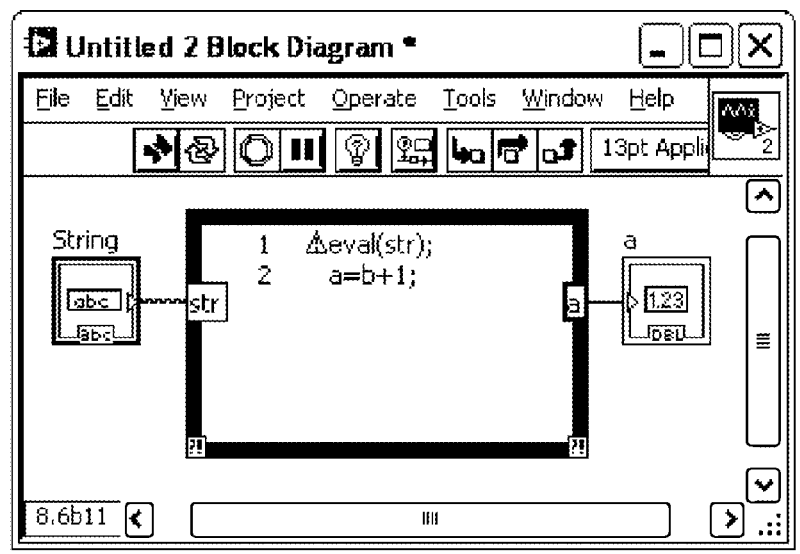

FIG. 9C provides an alternate method for indicating a possible error of the specified code. As shown, a warning triangle glyph may be displayed next to line 1 indicating that the code may not be properly analyzed or that there could be an error. Thus, FIGS. 9A-9C illustrate an exemplary case where edit time analysis may not be conclusive, but may indicate that to the user.

Figure 10:
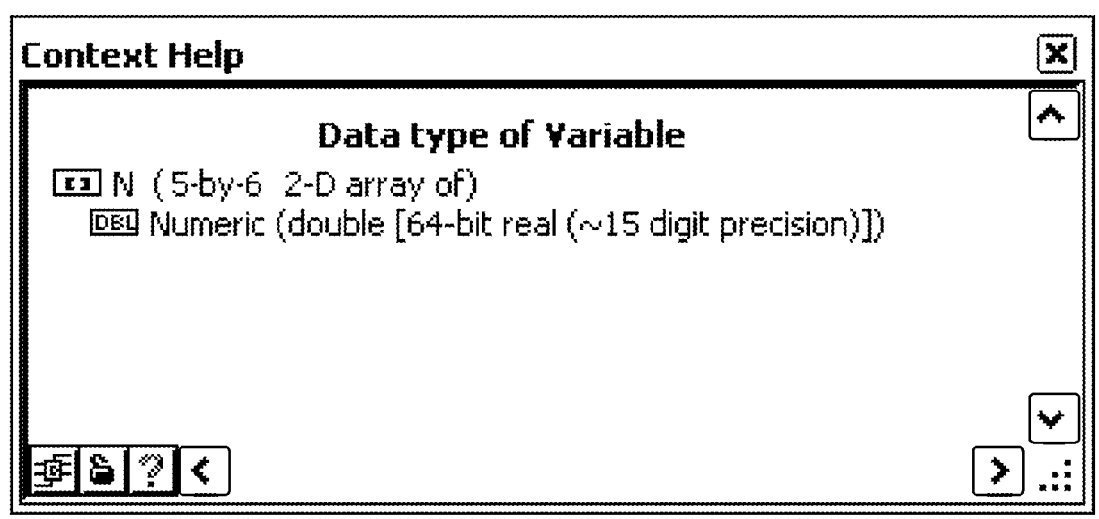

FIG. 10 illustrates an exemplary context help window. This window may indicate information about whatever symbol or line of code that the mouse cursor currently rests on (or otherwise selected portion, e.g., using a keyboard or other input device). In this particular example, a user could select a variable and see information about representation and array dimension. In this case, the variable N is a 5 by 6 array of numerics (double, 64 bit real with ~15 digit precision). However, any type of context help information may be displayed in this window. For example, further information regarding an error may be displayed when the user selects or positions the cursor over a glyph, such as those described above. Alternatively, the context window may be used for debugging where the user may view a current value stored in a variable. The context information may indicate the required syntax or the required types of inputs and outputs for a function. The context information may further include help information describing functionality of various functions or constants. Other context information is also envisioned.

In some embodiments, the context information window may be displayed as a pop up window which may only be displayed when the user positions the cursor over the object which invokes the contextual information (such as a variable, function, glyph, etc.), or the window may be displayed continually until the user closes it. Alternatively, the contextual information may be displayed all or most of the time, but the context information inside of the window may change dynamically as the user selects different objects or types different code. In one embodiment, the context information may correspond to the code that the user is typing and may act as an interactive guide during coding.

Figure 11A:
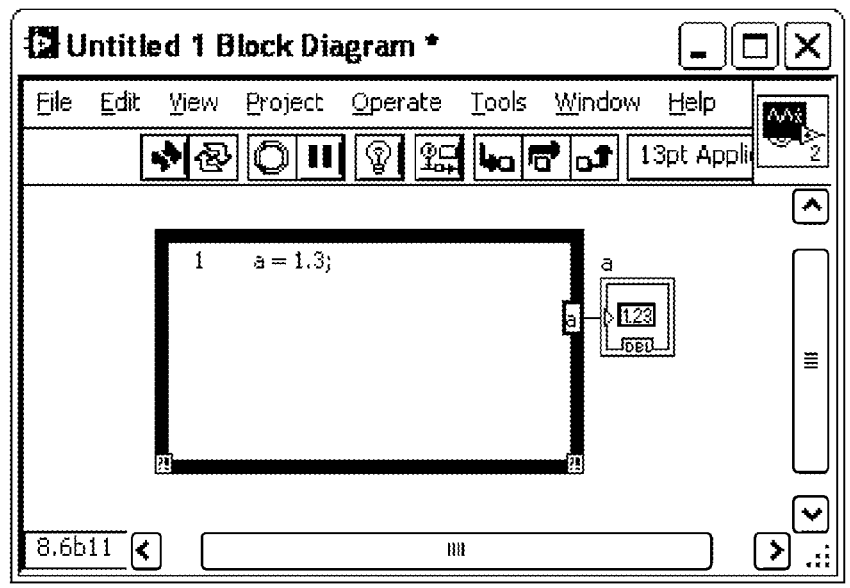
Figure 11B:
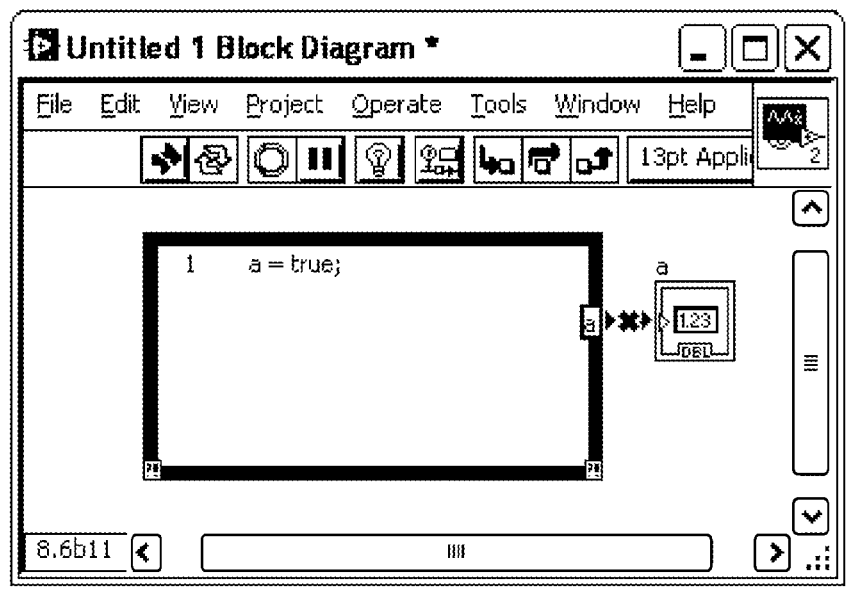
Figure 11C:
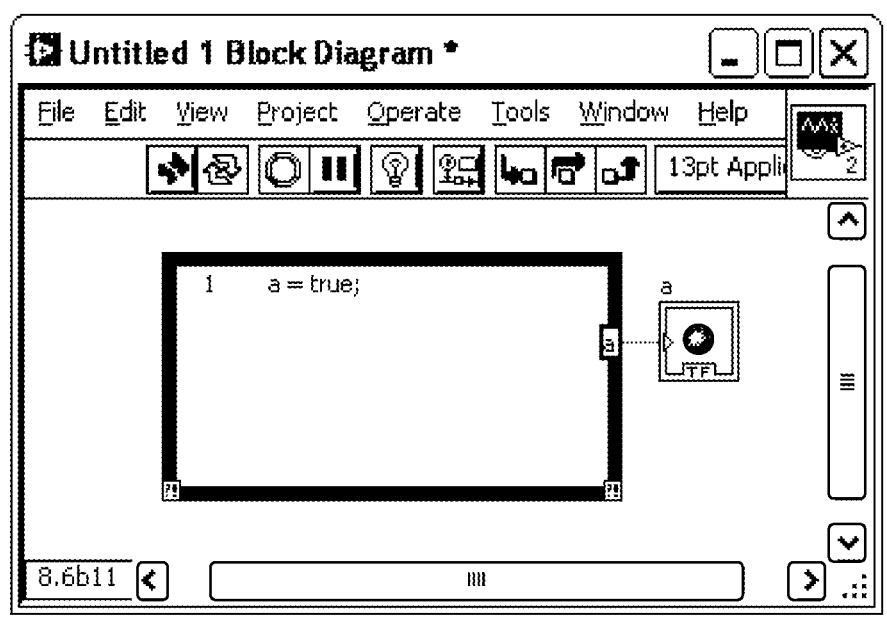

FIGS. 11A-11C provide examples of a graphical program including a node for textual code which provides output to a node in the graphical program. In this particular example, the appearance of the output terminals may automatically update to show the type calculated for those output. In FIG. 11a, "A" is a double scalar. This information is shown by the orange color of the "a" output (not shown) terminal and wire. In FIG. 11B, the data type of "a" changed to Boolean scalar. Accordingly, the wire between the terminal and the double graphical program node is broken as the types do not match. Note that the color of the terminal changes from orange to green (not shown) indicating the type of the terminal output is a Boolean. Finally, in FIG. 11C, the type of the graphical program node is changed to a Boolean, and accordingly, the wire is no longer broken. The wire and the node may also be green to indicate the type as a Boolean.

As another example, edit time analysis may include analysis of the types of variables, as indicated above. In addition to differentiating between different symbols (variables, constants, built-in functions, user-defined functions, etc.), the edit time analysis methods described herein may further distinguish between different types of variables. For example, the dimension may be determined. Consider the following script:

w=1;
x=[1 2 3];
y=[1; 2; 3; 4];
z=[1 2 3; 4 5 6];

In this script, the variable 'w' may be determined to be a scalar, 'x' may be determined to be a 3 element row vector, 'y' may be a 4 element column vector, and 'z' may be a 2 by 3 matrix.

In the following script:
a=1;
b=1.3;
c=true;
d=2.4-3i
e='hello';

The variable 'a' may be determined to be an integer, 'b' a double precision, 'c' a Boolean value, 'd' a complex double, and 'e' a string.

This type of information may be determined not just for constants as in the sample scripts above, but for any variable, whether defined from constants, built-in functions, user-defined functions, other variables, or other constructs: For example, in the following script:

M=rand(2+4);
N=eig(M);

The symbols 'rand' and 'eig' may be built-in functions. The described edit time checking may determine that the rand function will cause 'M' to be a 6 by 6 matrix of double precision values and that the 'eig' function may cause 'N' to be a 6 element column vector of complex precision.

Thus, the foregoing description illustrate exemplary text code and graphical programs, and exemplary, resulting warnings and errors which may be indicated to the user, e.g., according to the methods described above, among others.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for analyzing code written in a loosely typed language, comprising:
    receiving user input entering a first portion of a script in a node in a graphical program, wherein the graphical program comprises a plurality of interconnected nodes which visually indicate functionality of the graphical program, wherein the first portion of the script is written in the loosely typed language;
    hierarchically determining, at edit time, properties of symbols, and data type and dimensionality of variables, in the first portion and one or more referenced files which call or are called by the first portion, wherein the script is stored in a file that is separate from the one or more referenced files, wherein said hierarchically determining comprises separately analyzing the first portion of the script and the one or more referenced files at edit time, and wherein said separately analyzing comprises:
    automatically inferring data type and dimensionality of one or more variables in the script or the one or more referenced files at edit time;
    determining one or more errors in the first portion based on said hierarchically determining, wherein said determining the one or more errors is based on the properties of symbols, and data type and dimensionality of variables, in the one or more referenced files; and
    displaying the one or more errors determined based on the hierarchically determined properties of symbols, and data type and dimensionality of variable, in the first portion and the one or more referenced files during edit time of the script, wherein the one or more errors are displayed on a single screen of a display device.

2. The method of claim 1, wherein said receiving user input, said hierarchically determining properties, said determining one or more errors in the first portion based on the determining, and said displaying the one or more errors are performed interactively.

3. The method of claim 1, wherein the first portion of the script comprises a single line of code.

4. The method of claim 1, wherein the properties of the symbols comprise types of the symbols.

5. The method of claim 4, wherein the types of the symbols comprise functions, constants, and/or data container types.

6. The method of claim 1, wherein one or more of the symbols comprise functions, and wherein said determining properties of the symbols comprises determining any side effects of the functions other than their respective outputs.

7. The method of claim 1, wherein said determining the properties of the symbols comprises, for each symbol:
    determining numbers of required inputs or outputs as well as types for the required inputs or outputs; and
    determining whether calls to the symbol match the numbers and types of the required inputs or outputs.

8. A non-transitory memory medium storing program instructions for analyzing code written in a loosely typed language, wherein the program instructions are executable to:
    receive user input specifying code for a script in a node in a graphical program, wherein the graphical program comprises a plurality of interconnected nodes which visually indicate functionality of the graphical program,;
    analyze the specified code, wherein said analyzing comprises:
        determining one or more code portions referenced by the specified code, wherein the one or more code portions are stored in files separate from the script;

determining, at edit time, properties of symbols, and data type and dimensionality of variables, of the specified code and the one or more code portions, wherein said determining comprises separately analyzing the code for the script and the files separate from the script, and wherein said separately analyzing comprises:

automatically inferring data type and dimensionality of one or more variables in the script or the files separate from the script at edit time; and analyzing the specified code using the determined properties of symbols, and data type and dimensionality of variables, to determine errors in the specified code, wherein said analyzing is based on the properties of symbols, and data type and dimensionality of variables, of the one or more code portions; and graphically indicate one or more errors based on said analyzing, wherein the one or more errors are displayed on a single screen of a display device;

wherein said receiving user input, said analyzing the specified code, and said graphically indicating the one or more errors is performed at edit time of the script.

9. The non-transitory memory medium of claim 8, wherein said receiving user input, said analyzing, and said graphically indicating are performed interactively.

10. The non-transitory memory medium of claim 8, wherein said receiving user input specifying the code comprises receiving user input specifying a single line of code.

11. The non-transitory memory medium of claim 8, wherein the properties of the symbols comprise types of the symbols.

12. The non-transitory memory medium of claim 11, wherein the types of the symbols comprise functions, constants, and/or data container types.

13. The non-transitory memory medium of claim 8, wherein one or more of the symbols comprise functions, and wherein said determining properties of the symbols comprises determining any side effects of the functions other than their respective outputs.

14. The non-transitory memory medium of claim 8, wherein said determining the properties of the symbols comprises, for each symbol:

determining numbers of required inputs or outputs as well as types for the required inputs or outputs; and determining whether calls to the symbol match the numbers and types of the required inputs or outputs.

15. A non-transitory memory medium storing program instructions for analyzing code written in a loosely typed language, wherein the program instructions are executable to:

receive user input specifying code for a script in a node in a graphical program, wherein the graphical program comprises a plurality of interconnected nodes which visually indicate functionality of the graphical program;

determine one or more code portions referenced by the specified code, wherein the one or more code portions are stored in files separate from the script;

determine, at edit time, properties of symbols, and data type and dimensionality of variables, of the specified code and the one or more code portions, wherein said determining comprises separately analyzing the code for the script and the files separate from the script;

analyze the properties of the symbols, and data type and dimensionality of variables, of the specified code and the one or more code portions to determine semantics of the script, wherein said analyzing is based on the properties of symbols, and data type and dimensionality of variables, of the one or more code portions, wherein to analyze the properties of the symbols, the program instructions are executable to:

automatically infer data type and dimensionality of one or more variables in the script or the files separate from the script at edit time; and graphically indicate the semantics of the script on a display during edit time of the script, wherein the one or more errors are displayed on a single screen of a display device.

16. The non-transitory memory medium of claim 15, wherein said receiving user input and said graphically indicating are performed interactively.

17. The non-transitory memory medium of claim 15, wherein said receiving user input specifying the code comprises receiving user input specifying a single line of code.

* * * * *